United States Patent
Greenberger

(10) Patent No.: US 7,850,208 B2
(45) Date of Patent: Dec. 14, 2010

(54) STAMPED COLLET FOR PUSH-TO-CONNECT TUBE FITTINGS

(75) Inventor: Dorothy G. Greenberger, Kalamazoo, MI (US)

(73) Assignee: Parker-Hannifin Corporation, Cleveland, OH (US)

(*) Notice: Subject to any disclaimer, the term of this patent is extended or adjusted under 35 U.S.C. 154(b) by 736 days.

(21) Appl. No.: 11/610,869

(22) Filed: Dec. 14, 2006

(65) Prior Publication Data

US 2007/0138791 A1 Jun. 21, 2007

Related U.S. Application Data

(60) Provisional application No. 60/750,324, filed on Dec. 14, 2005.

(51) Int. Cl.
*F16L 35/00* (2006.01)
(52) U.S. Cl. .................. 285/39; 285/243; 285/323; 285/340
(58) Field of Classification Search ............. 285/39, 285/243, 322, 323, 340; 174/660, 661, 669
See application file for complete search history.

(56) References Cited

U.S. PATENT DOCUMENTS

| | | | | |
|---|---|---|---|---|
| 4,681,351 A | * | 7/1987 | Bartholomew | 285/319 |
| 4,778,203 A | * | 10/1988 | Bartholomew | 285/111 |
| 4,846,506 A | * | 7/1989 | Bocson et al. | 285/4 |
| 5,054,743 A | * | 10/1991 | Norkey et al. | 251/149.6 |
| 5,139,228 A | * | 8/1992 | Norkey et al. | 251/149.6 |
| 5,195,787 A | * | 3/1993 | Bartholomew | 285/319 |
| 5,228,729 A | * | 7/1993 | McElroy et al. | 285/319 |
| 5,257,833 A | * | 11/1993 | McNaughton et al. | 285/319 |
| 5,722,696 A | | 3/1998 | Taneya | |
| 5,732,984 A | * | 3/1998 | Bartholomew | 285/319 |
| 5,992,895 A | * | 11/1999 | Steinkamp | 285/45 |
| 6,380,483 B1 | * | 4/2002 | Blake | 174/668 |
| 6,843,507 B2 | | 1/2005 | Muto | |
| 6,869,109 B2 | | 3/2005 | Matsushita | |
| 2003/0122372 A1 | * | 7/2003 | Muto | 285/39 |
| 2005/0285394 A1 | * | 12/2005 | Muto | 285/307 |

FOREIGN PATENT DOCUMENTS

EP 1 038 138 7/1998

* cited by examiner

*Primary Examiner*—James M Hewitt
*Assistant Examiner*—Jay R Ripley
(74) *Attorney, Agent, or Firm*—Renner, Otto, Boisselle & Sklar, LLP

(57) ABSTRACT

A stamped collet for a push-to-connect tube coupling formed into a generally cylindrical configuration. The collet has an annular base portion from which flexible tines extend forward from the base portion, the flexible tines being circumferentially arranged around a center axis of the collet and including inwardly inclined distal finger portions terminating at a biting edge. The flexible tines can flex outwardly to permit axial insertion of a tube through the collet. At least one of the flexible tines has at least one cam wing that extends radially outwardly from a side of the tine and has a radially outwardly inclined cam surface. The cam surface can be engaged by a corresponding cam surface of a retainer to urge the tine radially inwardly with the biting edge biting into an outer surface of the tube for preventing the tube from being pushed out or pulled out of a coupling.

18 Claims, 8 Drawing Sheets

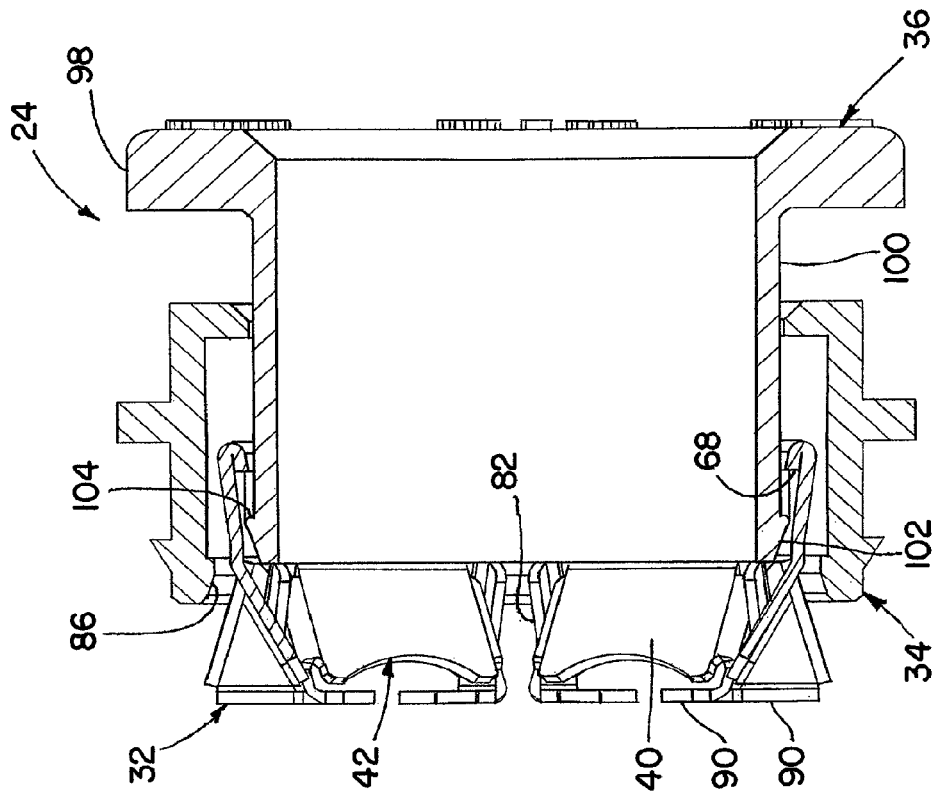
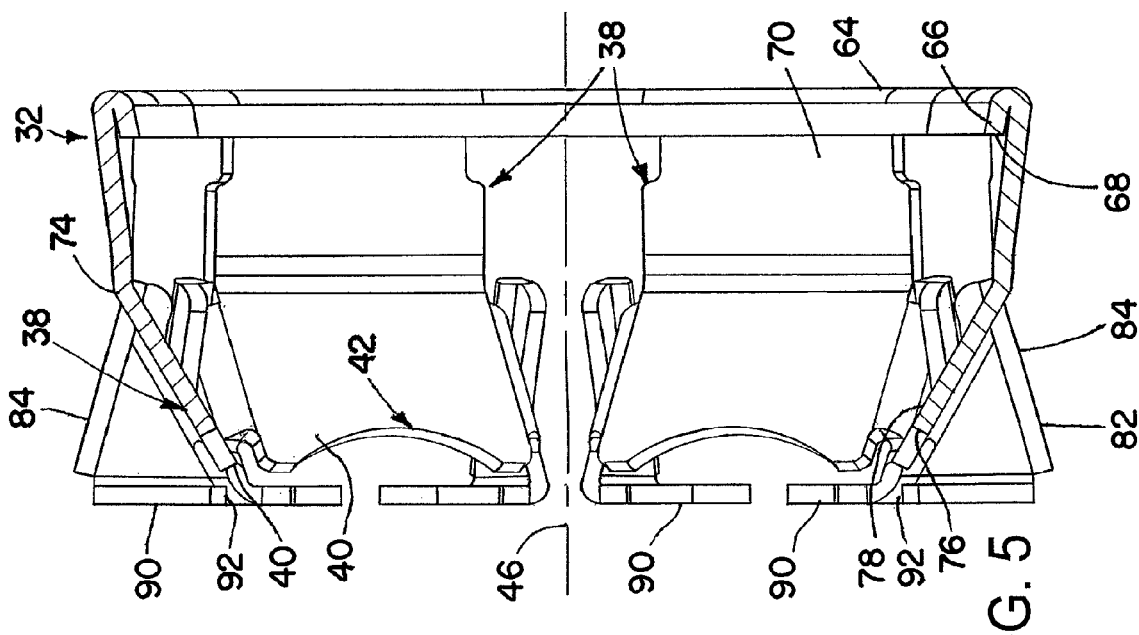

STAMPED COLLET FOR PUSH-TO-CONNECT TUBE FITTINGS

RELATED APPLICATION

This application claims the benefit of U.S. Provisional Application No. 60/750,324 filed Dec. 14, 2005, which is hereby incorporated herein by reference in its entirety.

FIELD OF THE INVENTION

The invention herein described relates generally to push-to-connect tube fittings and in particular to a stamped collet for use in such fittings.

BACKGROUND

Push-to-connect tube couplings of various types are known in the art. To make a connection, the end of a tube is inserted into the coupling. As the tube is inserted, the end of the tube is engaged by a collet, pawl or other means that grips the tube to prevent withdrawal of the tube from the coupling. Some existing machined collets have a tendency to bite through the tube when subjected to large forces or to lack sufficient holding strength.

SUMMARY OF THE INVENTION

The present invention provides a stamped collet for a push-to-connect tube coupling. The collet is stamped from a metal sheet and formed into a generally cylindrical configuration. The collet has an annular base portion from which flexible tines extend forward from the base portion, the flexible tines being circumferentially arranged around a center axis of the collet and including inwardly inclined distal finger portions terminating at a biting edge. The flexible tines can flex outwardly to permit axial insertion of a tube through the collet. At least one of the flexible tines has at least one cam wing that extends radially outwardly from a side of the tine and has a radially outwardly inclined cam surface. The cam surface can be engaged by a corresponding cam surface of a retainer to urge the tine radially inwardly with the biting edge biting into an outer surface of the tube for preventing the tube from being pushed out or pulled out of a coupling. In a preferred embodiment, the tines are configured to limit the amount the collet closes around the tube to prevent the tines from biting through the tube, while still providing resistance to high tensile forces acting on the hose.

In particular, a rearward edge portion of the annular base portion may be inwardly turned to form a catch, and more particularly reversely inwardly turned on itself to form the catch.

The flexible tines may have an abutment portion joined to at least one side thereof for movement therewith, the abutment portion being generally perpendicular to the center axis of the collet and disposed forward of the biting end of the respective tine. The abutment portion preferably has a radially inner edge that will engage the outer surface of the tube and operate to resist inward movement of the inclined tine portion to prevent the biting edge from biting through the tube while also providing additional gripping force on the tube at a location forward of the biting edge. The abutment portion may extend from a forward edge of the cam wing.

Each tine may have a connecting portion connecting the inwardly inclined distal finger portion to the annular base portion. The connecting portion may have at least a portion thereof having a width less than the width of the inclined distal finger portion whereby the tine will be more flexible near the base portion than near the biting edge.

The biting edge of the collet may be formed between a forward end face of the tine extending perpendicular to the inclined distal finger portion of the tine, and a radially inner surface of the inclined distal finger portion that forms with the central axis of the stamped collet an angle between 0° and 30°, and preferably no greater than 20°.

The cam wing may extend radially outwardly from a side of the inwardly inclined distal finger portion of the tine.

Each inwardly inclined distal finger portion may be generally rectangular.

The forward end of the inwardly inclined distal finger portion of the tine may be concave whereby the biting edge is concave to provide increased contact area relative to a straight edge.

Each tine may have a cam wing extending radially outwardly from each side of the inwardly inclined distal finger portion thereof, and each cam wing may have a radially outwardly inclined cam surface collectively defining a conical collet surface.

The collet is used in combination with the retainer that may have a radially inner conical cam surface for engaging the conical collet surface for urging the tines radially inwardly when the collet is shifted rearwardly relative to the retainer.

The retainer may have a radially outer surface provided with at least one retention device for securement in a cavity when pressed into the cavity, and the collet may be axially trapped between a bottom of the cavity and the retainer.

A tubular release member may be provided to enable easy release of the tube when desired. The release member, such as a release button, may have a head portion located to the rear of the retainer and a tubular portion extending telescopically through the retainer for engaging radially inner surfaces of the tines for urging the tines radially outwardly. The release member has a rearward position allowing the tines to contract radially inwardly, and is movable forwardly from the rearward position when pushed to urge the tines radially outwardly to release them from the hose.

The tubular portion of the release member may have on its outer diameter surface a rearwardly facing, radially outwardly extending ledge, and the rearward edge portion of the annular base portion of the collet may be inwardly turned as above mentioned to form a catch that captures the ledge on the tubular portion of the release member to block axial withdrawal of the release member from the retainer.

The stamped collet and retainer are insertable into a cavity in a coupling body, and an O-ring or other annular seal may be interposed between the collet and the bottom of the cavity.

The flexible tines each may have a planar abutment portion joined to at least one side thereof for movement therewith, the abutment portion being generally perpendicular to the center axis of the collet and disposed forward of the biting end of the respective tine, for collectively forming a seat for the O-ring.

Each tine may include a proximal connecting portion connecting the inclined distal finger portion to the annular base portion, and the retainer may have a generally cylindrical portion surrounding the connecting portions of the tines and limiting radial outward flexing of the connecting portions when a tube is being inserted into the collet.

The connecting portions may be generally rectangular, and each inclined finger portion may be joined to the respective connecting portion by a bent region of the finger. The angle of the bent region may be between about 20° and 40°.

According to another aspect of the invention, there is provided a method of retaining a tube to a push-to-connect tube coupling, wherein the tube coupling includes a stamped collet and a retainer for holding the collet in a cavity in a body. The method comprises the steps of using the biting edges of the flexible tines of the collet to bite into the outer surface of the tube when the tube is subject to a withdrawal force before digging into the outer surface of the tube, and limiting the amount to which the biting edges can close around the tube to prevent the biting edges from biting through the tube.

The foregoing and other features of the invention are hereinafter more fully described and particularly pointed out in the claims, the following description setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 5 is a cross-sectional view of the stamped collet, taken along the line Z-Z of FIG. 4; and FIG. 6 is a cross-sectional view of the stamped collet, retainer and release member in assembled relationship.

DETAILED DESCRIPTION

The reference herein to "tube" or "tubes" encompasses not only tubes but other tubular members such as flexible tubing, hoses or a tubular couplings, such as a short tubular piece to which a hose, tubing or the like is or can be coupled.

Figure 1:
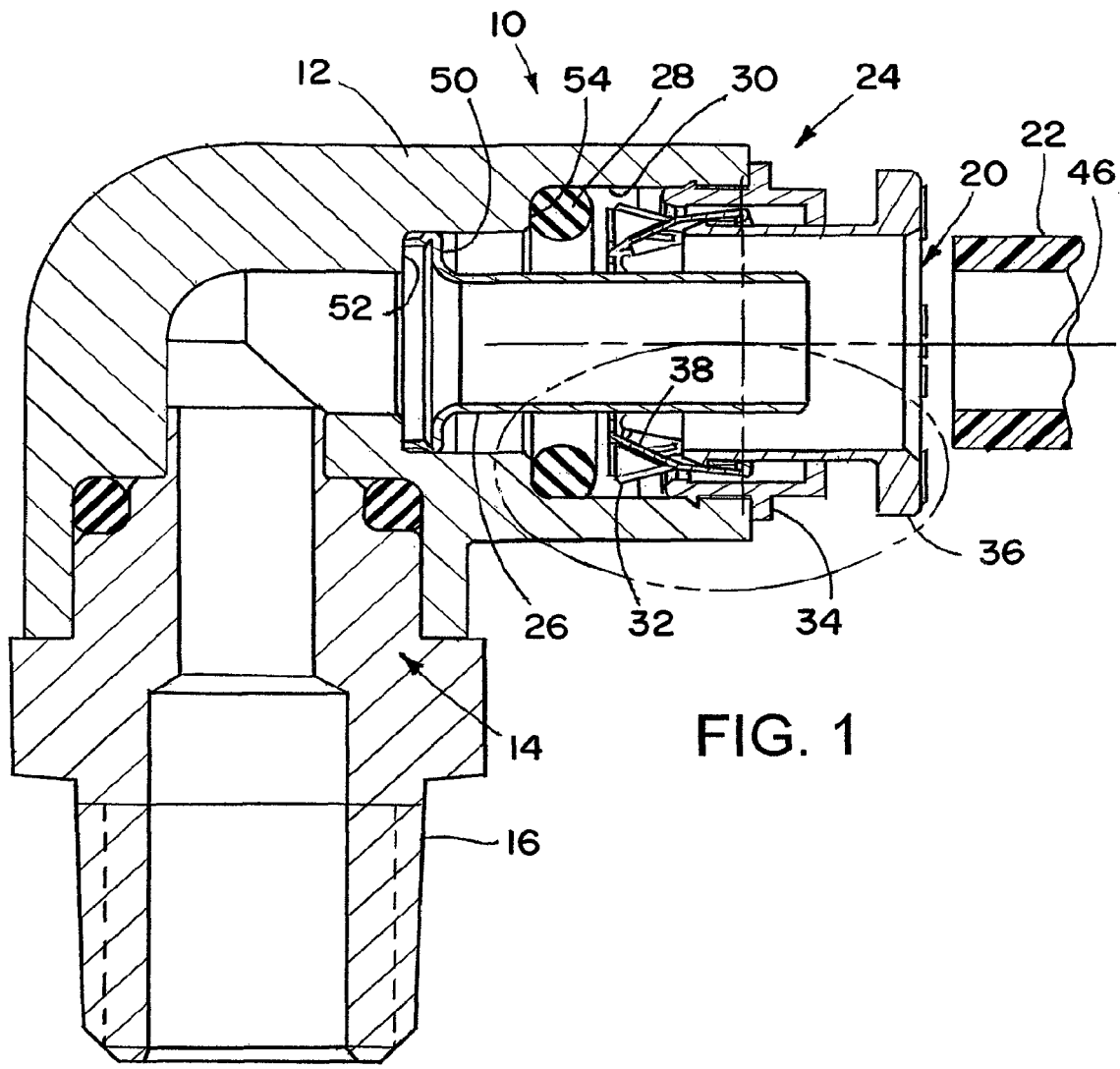
FIG. 1 is a cross-sectional view of an exemplary push-to-connect tube coupling according to the present invention.
Figure 2:
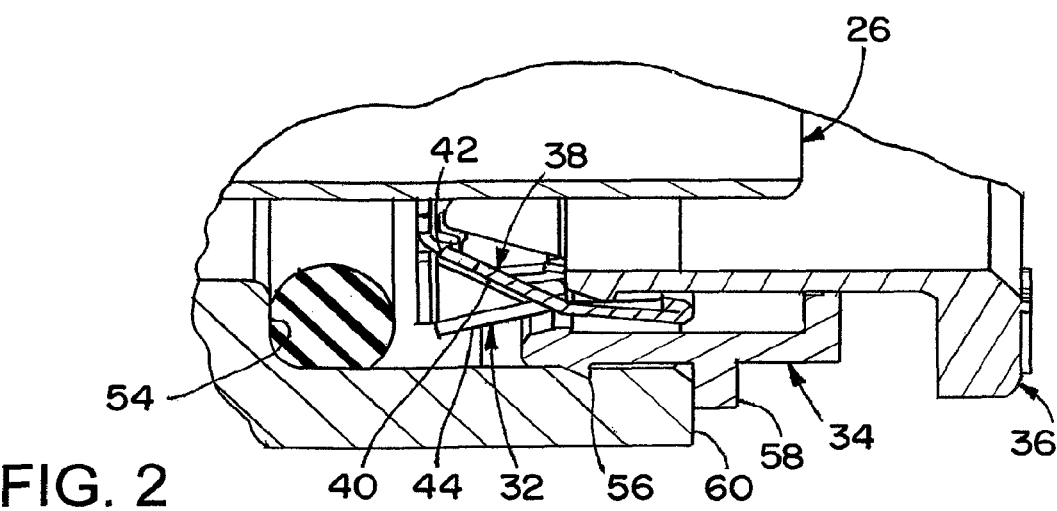
FIG. 2 is an enlarge portion of FIG. 1 showing in greater detail components of a coupling assembly including, inter alia, a stamped collet, retainer and release member.

Referring now in detail to the figures and initially FIGS. 1 and 2, an exemplary push-to-connect tube coupling according to the present invention is shown at 10. The illustrated tube coupling 10 includes a body 12 in the form of a right-angle elbow having a coupling port 14 for receiving a push-in fitting 16. The other end of the body 12 a tube port 20 into which a tube 22 can be inserted and held in the tube port by a tube coupling assembly 24.

The illustrated tube coupling assembly 24 generally comprises a tube support 26 over which the tube 22 is telescoped when inserted into the tube port 20, an annular seal 28 for sealing an exterior surface of the tube to an interior surface 30 of the port or port cavity 20 in the body 12, a stamped collet 32, a collet retainer 34 and a release member 36. As discussed further below, the collet 32 and retainer 34 function to retain the tube 22 in the port 20. To this end, the collet has a plurality of circumferentially spaced apart, axially extending tines 38 that can flex radially outwardly to allow telescopic insertion of the tube through the collet. Each tine has a radially inwardly inclined finger portion 40 terminating at a biting edge 42 for biting into the tube 22 and radially outer cam surfaces 40 that interact with the retainer 34 to hold the fingers 40 in biting engagement with the tube. The radially outer cam surface of each finger is inclined to a center axis 46 of the collet such any force acting to push or pull the tube out of the tube coupling will cause a corresponding increase in the gripping force exerted by the fingers on the tube.

The tube support 26 extends axially within the tube 22 to resist inward deformation of the tube, as may be desirable when the tube is made of an easily deformable material. The tube support may be radially outwardly stepped as shown to form an end abutment 50 for the tube, and the tube port surface 30 may be radially stepped to form a shoulder 52 that functions as a positive insertion stop for the tube support and the tube 22 telescoped thereover. If the tube 22 is made of a material having sufficient strength to resist the anticipated radial gripping loads acting thereon in a particular application, the tube support 26 can be dispensed with.

The cavity surface 30 may be further radially stepped to form a shoulder 54 that provides a radial stop for locating and holding the annular seal 28 in the port cavity. The annular seal, which may be an O-ring for example, is retained in the port cavity 20 by its frictional engagement with the interior surface 30 and by the collet 32 which prevents pressurized fluid in the coupling from forcing the O-ring out of the port cavity.

The retainer 34 may be held in the port in the coupling body by any suitable retention means. As shown, the outer diameter surface of the retainer is provided with one or more annular ridges 56, particularly barbs, for biting into the interior surface of the port cavity when the retainer is pushed forwardly into the port in the body. Other means that may be employed include sonic welding and adhesives, for example. The retainer is also provided with a radially outwardly extending annular flange 58 which engages an end face 60 of the body 17 to limit the extent to which the retainer can be inserted into the port 20.

The references herein to "forward" and "forwardly" are used in relation to the direction of insertion of the collet and retainer into the coupling body, to the left in FIG. 1 and 2. The references to "rear" and "rearwardly" are used to denote the opposite direction. This is done as a matter of convenience for the purpose of denoting relationships between various components, portions or parts of the herein described components.

Figure 4:
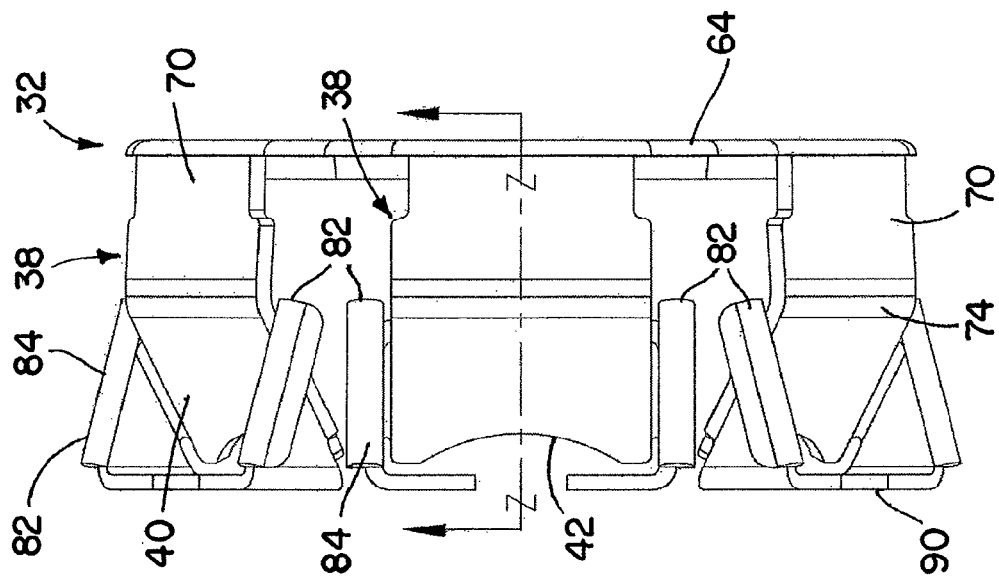
FIG. 4 is a side elevational view of the stamped collet.
Figure 3:
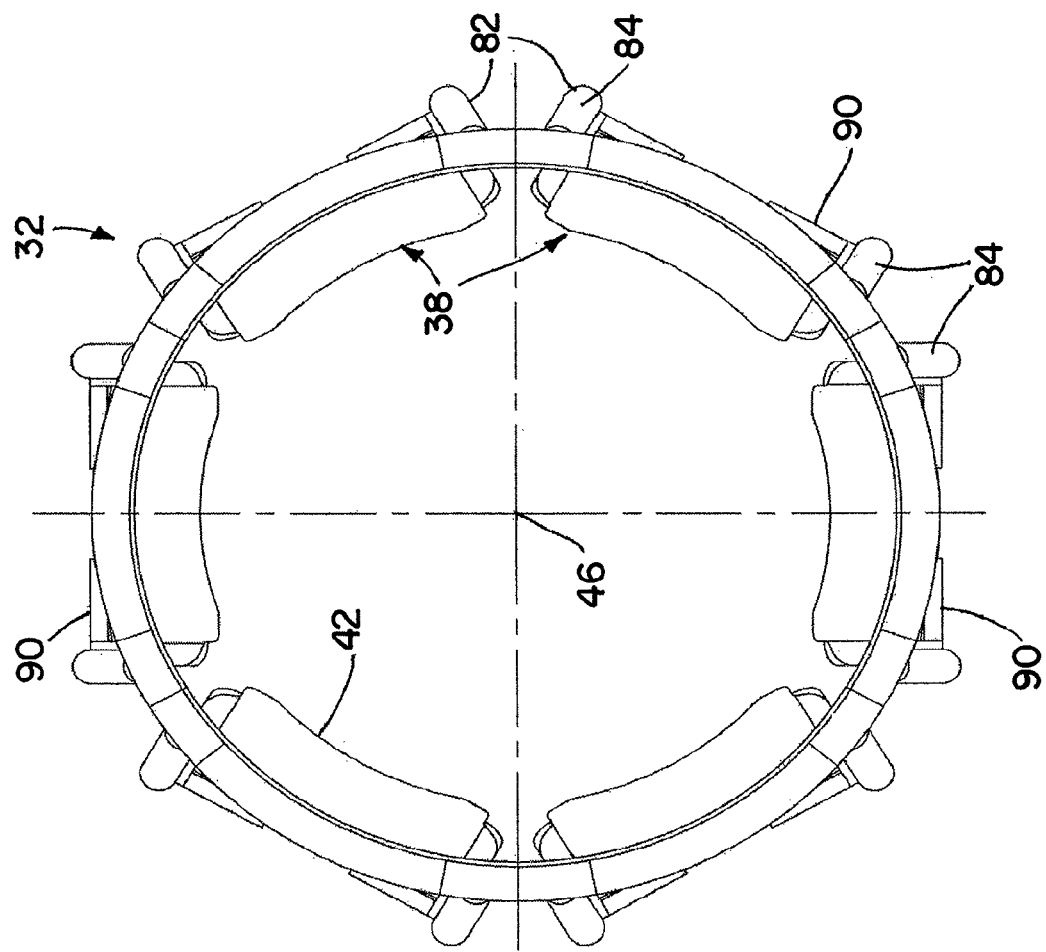
FIG. 3 is an axial end view of the stamped collet.
Figure 7:
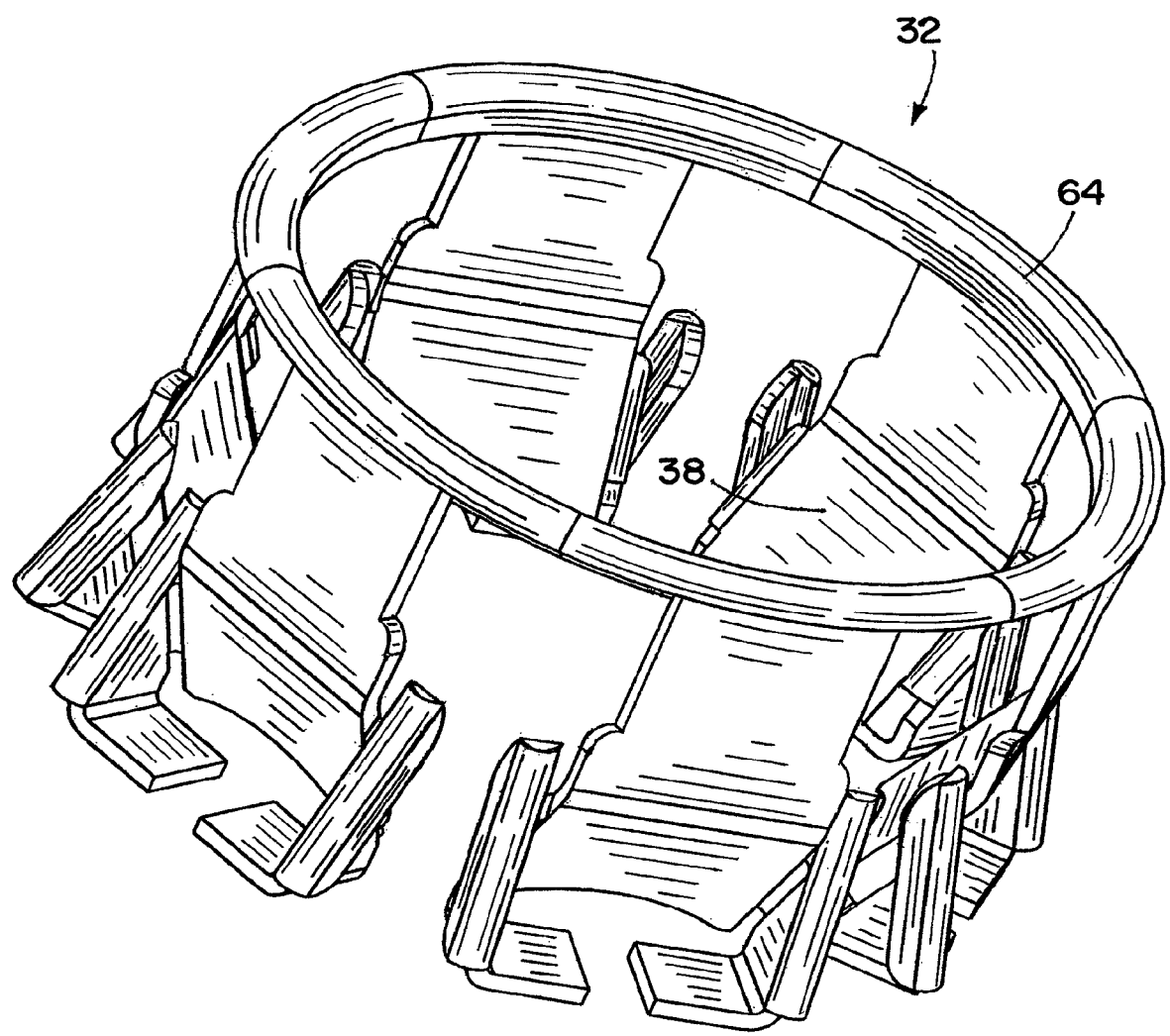
FIG. 7 is a perspective view of a first axial end of the stamped collet.
Figure 8:
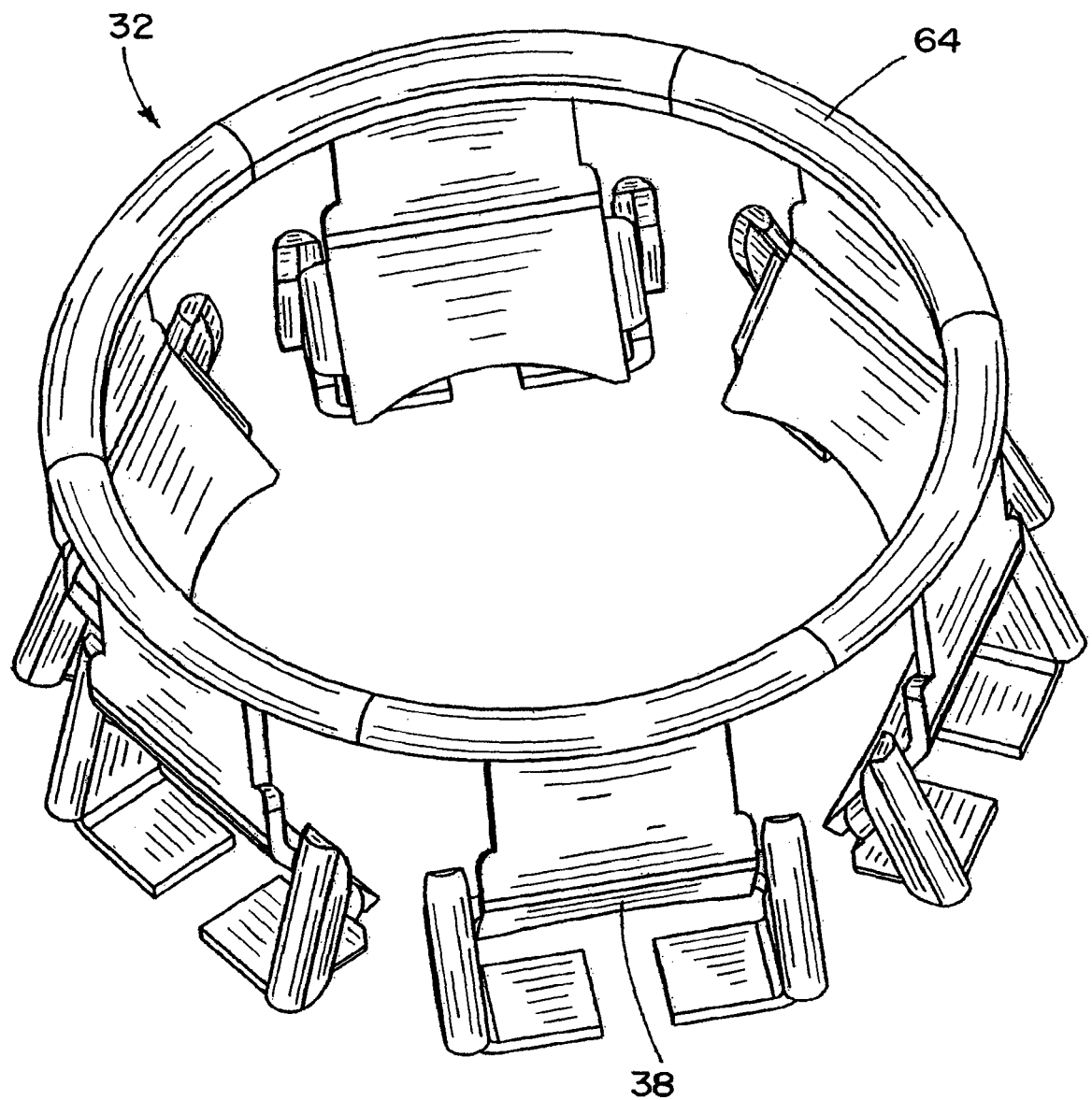
FIG. 8 is another perspective view of the first axial end of the stamped collet.
Figure 9:
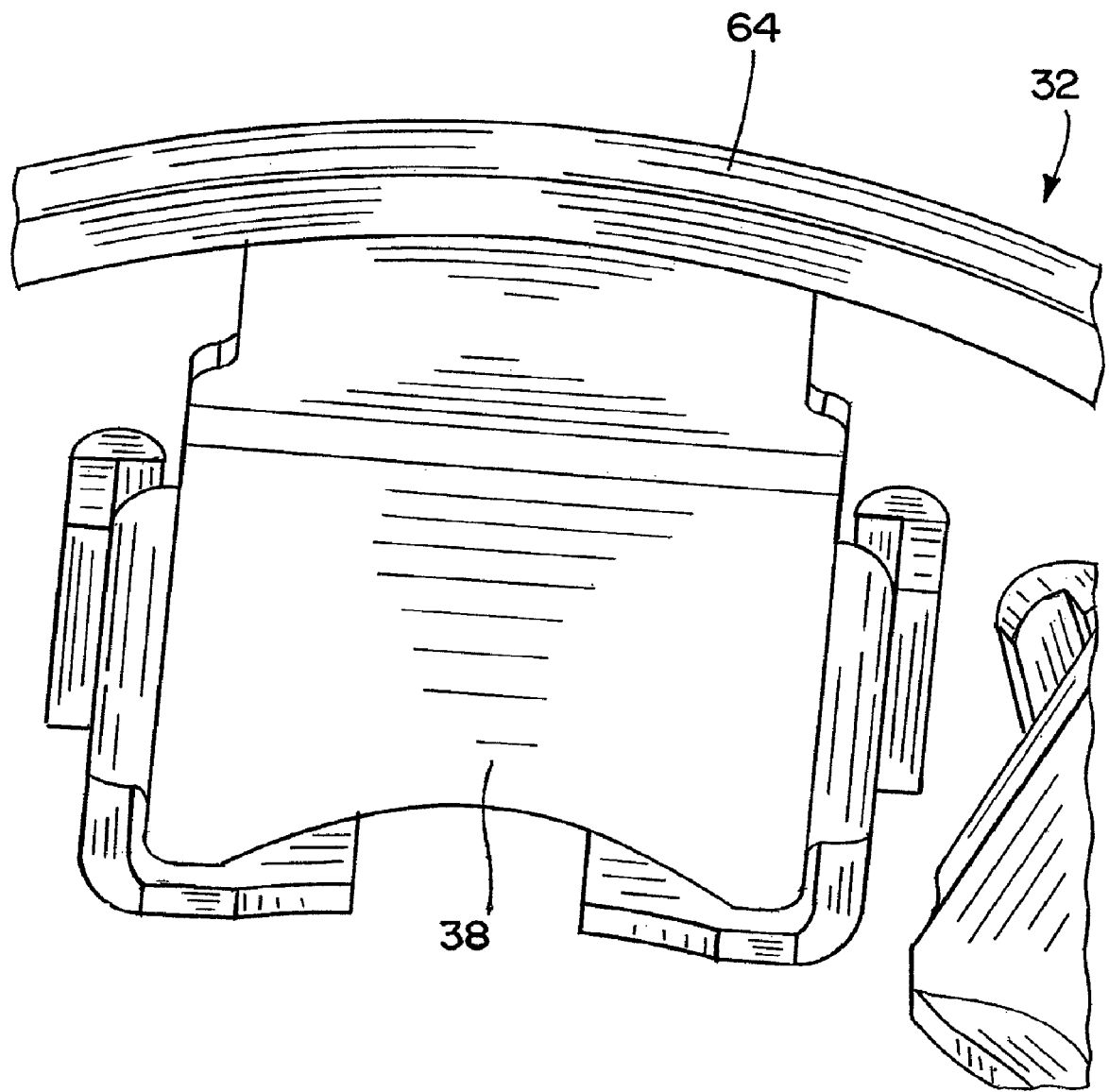
FIG. 9 is an enlarged perspective view of a tine of the stamped collet.
Figure 10:
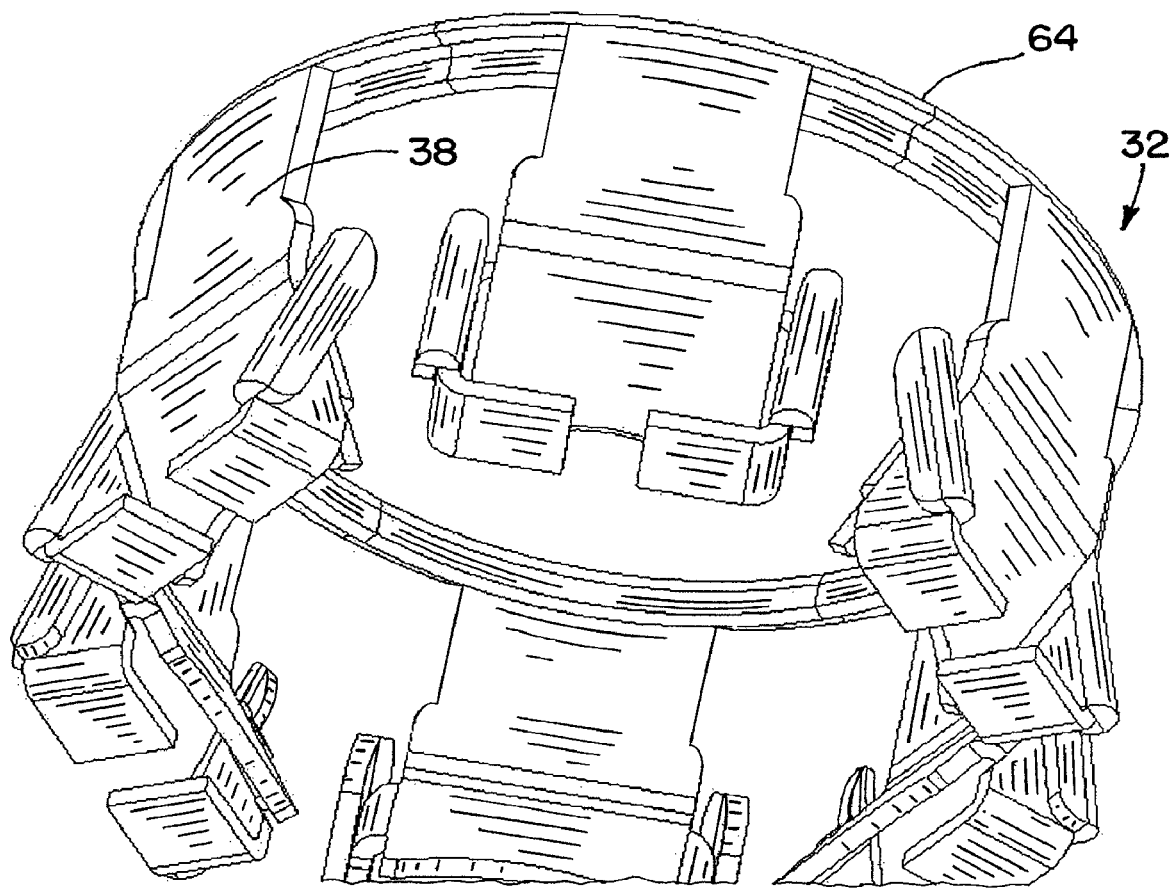
FIG. 10 is a perspective view of a second axial end of the stamped collet.
Figure 11:
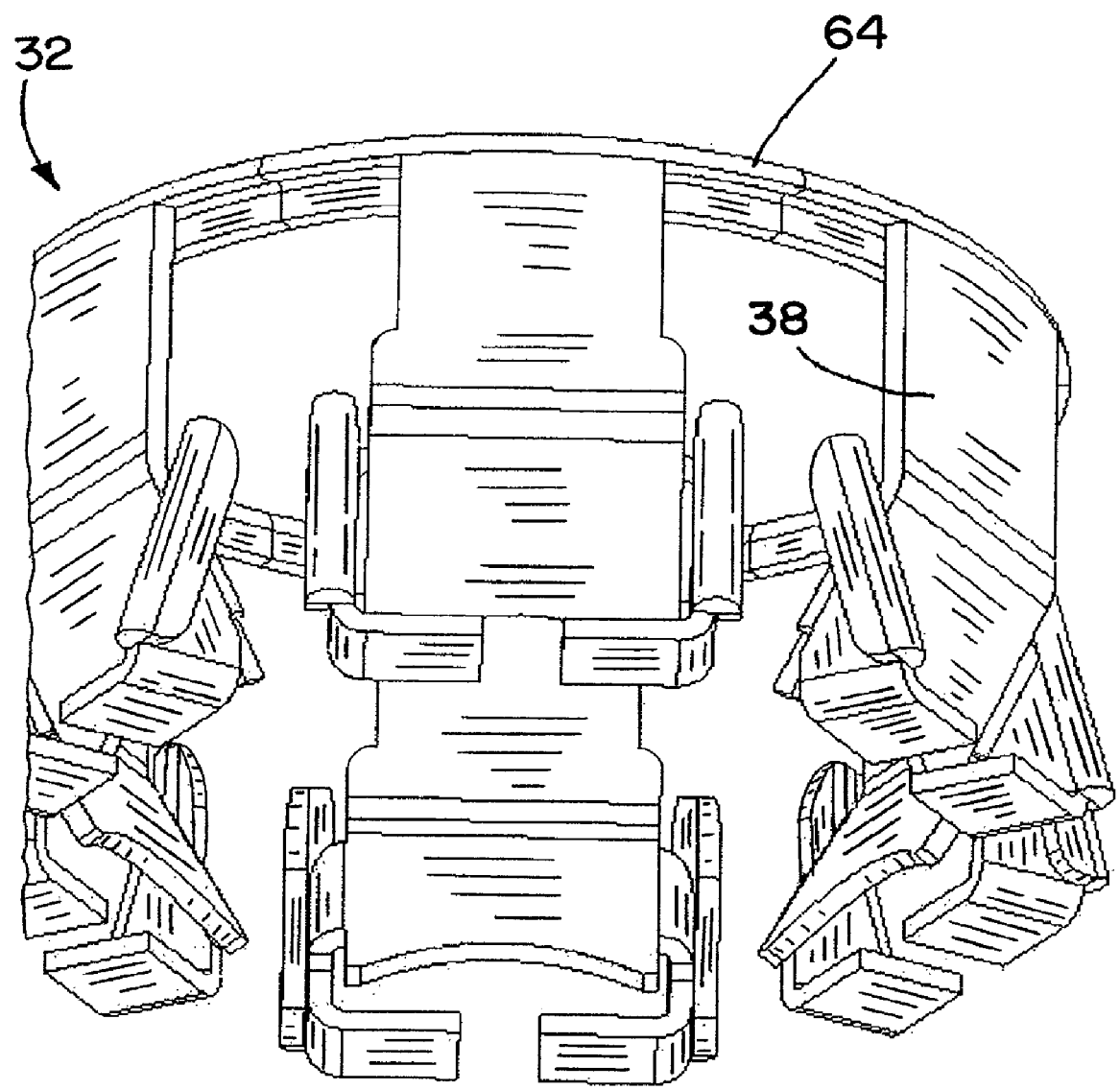
FIG. 11 is another perspective view of the second axial end of the stamped collet.

In FIGS. 3-5, the stamped collet 32 is shown in greater detail. The collet is stamped from a metal sheet, such as a stainless steel sheet. The metal sheet may be of any suitable thickness for the given application, and typically will be between about 0.008" and about 0.013". The stamped blank is then subjected to forming operations that form the blank into a generally cylindrical configuration with the below-described features.

As shown, the collet 32 has an annular base portion 64 from which flexible tines 38 extend forward from the base portion. A rearward edge portion 66 of the annular base portion may be inwardly turned, and more particularly reversely inwardly turned on itself, to form the catch 68. As discussed further below, the catch 68 functions to prevent the release member 36 from being axially withdrawn out of the collet.

The flexible tines 38 are circumferentially arranged around the center axis 46 of the collet. The number of tines may be varied as desired, there being six in the illustrated collet equally circumferentially spaced around the center axis. Each tine includes the inwardly inclined distal finger portion 40 terminating at the biting edge 42 and a rearward or proximal connecting portion 70 joining the inclined finger to the base portion 64. The connecting portion 70 of each tine extends generally axially (generally parallel to the center axis) while the finger portions 40 are inclined to the center axis 46 for extension into the path of a tube 22 (FIG. 1) when the tube is inserted axially through the collet. The flexible tines, however, can flex outwardly to permit such axial insertion of the tube through the collet.

Both the finger portion 40 and connecting portion 70 can be of generally rectangular shape and joined to the respective connecting portion by a bent region 74 of the finger. The angle of the bent region may be between about 20° and 40°. The connection portion 70 may have at least a portion thereof provided with a width less than the width of the inclined distal finger portion 40 whereby the tine will be more flexible near the base portion 64 than near the biting edge 42.

The biting edge 42 of each finger 40 may be formed between a forward end face 76 of the tine extending perpendicular to an inner surface 78. The radially inner surface 78 of the inclined distal finger 40 forms with the central axis of the stamped collet an angle between 0° and 30°, and preferably no greater than 20°. The forward end of the inwardly inclined distal finger portion of the tine may be concave over the transverse extent thereof, whereby the biting edge is concave to provide a contact area of elliptical shape that is greater than what would result from a straight edge.

Each flexible tine 38 has cam wings 82 that extend radially outwardly from respective sides of the inclined finger portion 40. In particular, the cam wings 82 are bent out of the plane of the inclined finger portion, particularly at right angles to the inclined finger portion 40. Each cam wing is further configured to have a radially outwardly inclined cam surface 84. The cam surface can be engaged by a corresponding cam surface 86 (FIG. 6) of the retainer 34 to urge the tine radially inwardly with the biting edge biting into an outer surface of the tube for preventing the tube from being pushed out or pulled out of a coupling. As shown, the cam surface may be formed by a turned outer edge of the cam wing, if desired, to provide a larger and somewhat rounded surface area for engaging the cam surface of the retainer. The cam wings, and particularly the cam surfaces, each have an axial length approximately equal the axial length of the fingers.

Each flexible tine 38 may further have an abutment portion 90 joined to at least one side thereof for movement therewith. The abutment portion 90 preferably is generally perpendicular to the center axis of the collet and disposed forward of the biting edge 42 of the respective tine. The abutment portion has a radially inner edge 92 radially outwardly offset from the biting edge of the tine. When the inner edge of the abutment portion engages the tube, further radial contraction of the biting edges of the finger portions will be resisted to a greater extent than by the incline fingers because the abutment will provide a more rigid (less flexible) resistance to contraction of the fingers. Also, the inner edge surfaces of the abutments extend axially and thus will dig into the base to a lesser extent by reason of the larger contact area (flat face vs. edge corner). Thus, the abutments serve to prevent the biting edges of the fingers from biting through the tube wall. In addition, the inner edge of each abutment portion will bite into the outer surface of the tube, albeit to a lessor extent, to provide additional gripping force on the tube at a location forward of the biting edge. Each finger preferably has two such abutment portions bent from forward edges of a respective cam wing.

In FIG. 6, the collet 32 is shown assembled with the retainer 34 and release member 36. The retainer has the radially inner conical cam surface 86 for engaging the conical collet surfaces 84 for urging the tines 38 radially inwardly when the collet is shifted rearwardly relative to the retainer. The release member, such as a release button, has a head portion 98 located to the rear of the retainer and a tubular portion 100 extending telescopically through the retainer for engaging radially inner surfaces 78 of the tines for urging the tines radially outwardly. The release member has a rearward position shown in FIG. 6 allowing the tines to contract radially inwardly. The release member can be push forwardly from the rearward position shown in FIG. 6 to urge the tines radially outwardly to release them from the hose. To this end the leading end of the tubular portion may have an inclined ramp surface 102 for engaging the radially inner surfaces of the inclined fingers.

The tubular portion 100 of the release member may have on its outer diameter surface a rearwardly facing, radially outwardly extending ledge 104. The ledge will be engaged by the catch 68 on the annular base portion 64 of the collet to block axial withdrawal of the release member from the retainer.

As shown in FIGS. 1 and 2, the stamped collet 32, retainer 34 and release member 36 are insertable into the port cavity in a coupling body, and the O-ring 28 or other annular seal will be interposed between the collet and the bottom of the cavity. The abutment members 90 of the tines collectively present a planar radially extending abutment surface that will serve as a seat for the annular seal to prevent the seal from being forced out by high pressure fluid in the coupling and tube.

Once inserted into the coupling body 12, the coupling assembly 24 provides a push-to-connect tube coupling. The tube 22 can be axially inserted through the release mechanism (if provided), the retainer 34 and the collet 32, and telescopically over the tube support 26 (if provided). The tube preferably is inserted as far as possible to ensure that the tube is surrounded by the annular seal. As the tube is inserted, the leading end of the tube will engage the radially inner surfaces 78 of the inclined finger portions 40 of the tines to cause the tines to flex radially outwardly to allow the tube to pass through the collet. Radial expansion of the tines will be somewhat constrained at the connecting portions thereof by the radially inner surface of the retainer which limits the amount of such expansion.

Once the tube 22 has been inserted, reverse movement of the tube relative to the retainer 34 will cause the collet 32 to shift rearwardly until the cam surfaces 84 of the tines engage the conical cam surface 86 of the retainer, thereby urging the inclined fingers radially inwardly and causing the biting edges 42 thereof to bite into the outer surface of the hose which may cause tube material to be shaved off or bunched in front of the biting edges. As the withdrawal force acting on the hose increases, the tines will continue to close around the hose until the radially inner edges of the abutment portions 90 engage and start digging into the hose substantially at right angles to the central axis. As above mentioned, this will inhibit further radial contraction of the tines around the hose, thereby preventing the biting edges from biting through the tube. In addition or alternatively, the sides of the tines will engage one another to inhibit further contraction, preferably as a secondary limiting device with the first limiting device being the engagement of the abutment members with the tube. With the foregoing arrangement, a tensile force beyond that rated for the coupling will usually cause, before any biting through the tube, the shear strength of the tube to be exceeded or the tube to neck down enough for the tube to slip out of the collet.

The collet is further illustrated in FIGS. 7-11 of the drawings.

Although the invention has been shown and described with respect to a certain embodiment or embodiments, it is obvious that equivalent alterations and modifications will occur to others skilled in the art upon the reading and understanding of this specification and the annexed drawings. In regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A stamped collet for a push-to-connect tube coupling, the collet being stamped from a metal sheet and formed into a generally cylindrical configuration, the collet having an annular base portion from which flexible tines extend forward from the base portion, the flexible tines being circumferentially arranged around a center axis of the collet and including inwardly inclined distal finger portions terminating at a biting edge for biting into a tube that has been inserted into the collet, wherein at least one of the flexible tines has an abutment portion connected to at least one side thereof for movement therewith, the abutment portion being generally perpendicular to the center axis of the collet and disposed forward of the biting edge of the respective tine, and wherein the abutment has a radially inner edge configured to engage the outer surface of the tube and configured to operate to resist inward movement of the inclined finger portion to prevent the biting edge from biting through the tube while also providing additional gripping force on the tube at a location forward of the biting edge.

2. A stamped collet for a push-to-connect tube coupling, the collet being stamped from a metal sheet and formed into a generally cylindrical configuration, the collet having an annular base portion from which flexible tines extend forward from the base portion, the flexible tines being circumferentially arranged around a center axis of the collet and including inwardly inclined, substantially planar, distal finger portions terminating at a biting edge for biting into a tube that has been inserted into the collet, wherein at least one of the flexible tines has an abutment portion that is generally perpendicular to the center axis of the collet, wherein the abutment portion is connected to a side of the tine for movement therewith, the abutment portion being disposed forward of the biting edge of the respective tine, wherein the abutment portion is a planar abutment that extends from a forward edge of a wing, and wherein the abutment portion has a radially inner edge configured to engage the outer surface of the tube and configured to operate to resist inward movement of the inclined finger portion to prevent the biting edge from biting through the tube while also providing additional gripping force on the tube at a location forward of the biting edge.

3. A collet according to claim 2, wherein a rearward edge portion of the annular base portion is inwardly turned on itself to form a catch.

4. A collet according to claim 2, where each tine has a connecting portion connecting the inwardly inclined distal finger portion to the annular base portion, and the connecting portion has at least a portion thereof having a width less than the width of the inclined distal finger portion whereby the tine will be more flexible near the base portion than near the biting edge.

5. A collet according to claim 2, wherein the biting edge of the collet is formed between a forward end face of the tine extending perpendicular to the inclined distal finger portion of the tine, and a radially inner surface of the inclined distal finger portion that forms with the central axis of the stamped collet an angle no greater than 20°.

6. A collet according to claim 2, wherein the wing extends radially outwardly from a side of the inwardly inclined distal finger portion of the tine.

7. A collet according to claim 2, wherein each inwardly inclined distal finger portion is generally rectangular.

8. A collet according to claim 2, wherein a forward end of the inwardly inclined distal finger portion of the tine is concave, whereby the biting edge is concave.

9. A combination comprising the collet of claim 8 with a retainer, wherein the retainer has a radially outer surface provided with at least one retention device for securement in a cavity when pressed into the cavity, and the collet is axially trapped between a bottom of the cavity and the retainer.

10. A combination according to claim 9, further comprising a tubular release member having a head portion located to the rear of the retainer and a tubular portion extending telescopically through the retainer for engaging radially inner surfaces of the tines for urging the tines radially outwardly, the release member having a rearward position allowing the tines to contract radially inwardly, and the release member being movable forwardly when pushed to urge the tines radially outwardly to release them from the hose.

11. A combination according to claim 10, wherein the tubular portion of the release member has on its outer diameter surface a rearwardly facing, radially outwardly extending ledge, and the rearward edge portion of the annular base portion of the collet is inwardly turned to form a catch that captures the ledge on the tubular portion of the release member to block axial withdrawal of the release member from the retainer.

12. A combination according to claim 9, further comprising a body including the cavity and an O-ring interposed between the collet and the bottom of the cavity.

13. A combination according to claim 12, wherein the abutment portion is for collectively forming a seat for the O-ring.

14. A collet according to claim 2, wherein each tine has a wing extending radially outwardly from circumferentially opposite sides of the inwardly inclined distal finger portion thereof.

15. A combination comprising the collet of claim 14 with a retainer having a radially inner conical surface for engaging the conical collet surface for urging the tines radially inwardly when the collet is shifted rearwardly relative to the retainer.

16. A combination according to claim 15, wherein each tine includes a proximal connecting portion connecting the inclined distal finger portion to the annular base portion, and wherein the retainer has a generally cylindrical portion surrounding the connecting portions of the tines and limiting radial outward flexing of the connecting portions when a tube is being inserted into the collet.

17. A stamped collet for a push-to-connect tube coupling being in combination with a retainer, the collet being stamped from a metal sheet and formed into a generally cylindrical configuration, the collet having an annular base portion from which flexible tines extend forward from the base portion, the flexible tines being circumferentially arranged around a center axis of the collet and including inwardly inclined distal finger portions terminating at a biting edge for biting into a tube that has been inserted into the collet, wherein each tine has a wing extending radially outwardly from circumferentially opposite sides of the inwardly inclined distal finger portion thereof, wherein each tine includes a proximal connecting portion connecting the inclined distal finger portion to the annular base portion, and wherein the retainer has a generally cylindrical portion surrounding the connecting portions of the tines and limiting radial outward flexing of the connecting portions when a tube is being inserted into the collet, wherein the connecting portions are generally rectangular, and wherein each inclined finger portion is connected to the respective connecting portion by a bent region of the finger.

18. A collet according to claim 17, wherein the angle of the bent region is between about 20° and 40°.

* * * * *